Feb. 26, 1924.

F. C. KIRCHHOFF

ICE CREAM SCOOP

Filed Jan. 9, 1923

1,484,716

INVENTOR
F. C. KIRCHHOFF

ATT'YS

Patented Feb. 26, 1924.

1,484,716

UNITED STATES PATENT OFFICE.

FREDERICK C. KIRCHHOFF, OF SAN FRANCISCO, CALIFORNIA.

ICE-CREAM SCOOP.

Application filed January 9, 1923. Serial No. 611,600.

*To all whom it may concern:*

Be it known that I, FREDERICK C. KIRCHHOFF, a citizen of the United States, residing at San Francisco, in the county of San Francisco and State of California, have invented new and useful Improvements in Ice-Cream Scoops, of which the following is a specification.

This invention relates to improvements in devices for dishing or scooping ice cream and the like and resides in the provision of a device of this character which will be simple as to construction, strong, durable, compact and capable of being easily and effectively operated to scoop ice cream in the form of balls of predetermined sizes.

Another object of the invention is to provide in a scoop of the character described a simple and effective means for preventing ice cream from sticking to the scoop.

A further object is to provide a scoop of the character described which will automatically discharge or release the ice cream after a scooping operation and upon release of pressure on the operating member.

The invention possesses other advantages and features some of which, with the foregoing will be set forth at length in the following description where I shall outline in full that form of the invention which I have selected for illustration in the drawing accompanying and forming a part of the present specification. In said drawing I have shown one form of the construction of my invention, but it is to be understood that I do not limit myself to such form since the invention as expressed in the claims may be embodied in a plurality of forms.

Referring to the drawing.

Figure 2:
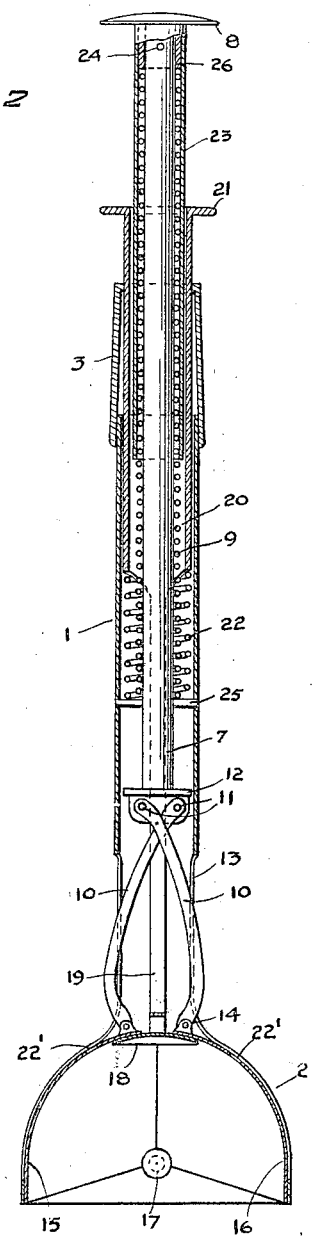
Fig. 2 represents a side elevation of the scoop.
Figure 1:
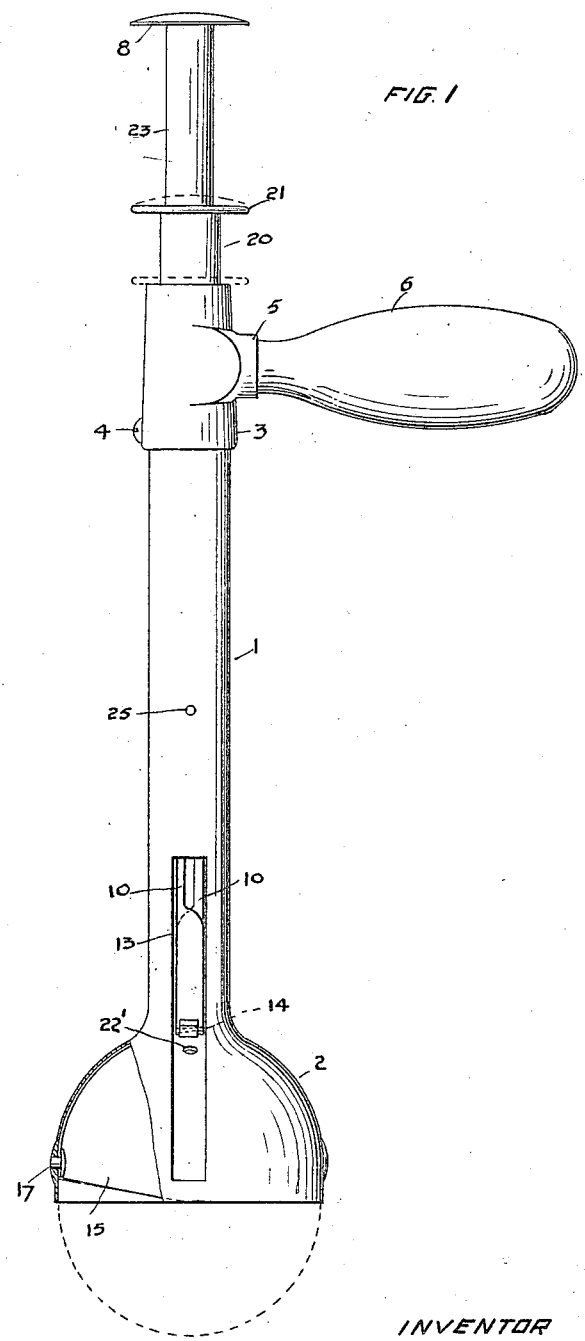
Fig. 1 represents a vertical sectional view taken through the device of my invention.

The embodiment of the invention illustrated in the drawing comprises a tubular body portion 1 carried on one end of which is a substantially semi-spherical scoop member 2, which latter may be either attached to or formed integral with the body. At the other end of the tubular body 1 a sleeve 3 is held in place by a set screw 4, and this sleeve carries a handle socket 5 in which a handle 6 is mounted, the latter extending at right angles to the body portion 1.

Slidable longitudinally in the body 1 is an operating rod 7 having a circular thumb piece or head 8 at its outer end and which is held extended by an expansion spring 9. The other end of the rod 7 has crossed arms 10 pivoted as at 11 to an enlargement 12 on the rod. The crossed arms 10 extend in part through slots 13 formed in the tubular body 1 and extending into the scoop member 2. The arms are pivoted as at 14 to segment scoop members 15 and 16 which are housed within the scoop member 2 and are arranged so that when extended will form with said member 2 a spherical container. The members 15 and 16 are pivoted as at 17 to the scoop member 2 and have comparatively sharp lower edges which provides for an effective cutting or scooping of the ice cream. The arms 13 are arcuate and have their convex portions facing outward so that when the rod 7 is depressed, said arms will move downardly and outwardly through the slots 13 in arcuate downward, outward and inward paths and will conform closely to the curve of the scoop. Portions of the arms, when the segments are extended, will lie in the portions of the slots which are cut into the body member 2 so that the rods do not project appreciably nor the body portion 1.

To prevent the sticking of the ice cream to the scoop there is provided adjacent the center of the scoop member 2, a small concavo-convex disk 18 which is thin and conforms closely to the contour of the segments 15 and 16. When the segments 15 and 16 are in normal position, the opposed edges thereof come in contact with one another and said members act as a lining for the scoop 2. The disk 18 is carried on the lower ends of rods 19 which are spaced apart and extend on opposite sides of the rods 7. The rods 19 are joined at their upper ends to a tubular member 20 which surrounds the rod 7. The member 20 extends above the sleeve 3 and is provided with an annular flange 21 on its upper end so that it may be readily engaged by the thumb of the operator and the sleeve depressed. A suitable spring 22 is associated with the tubular member 20 so as to normally hold the disk against the scoop and the sleeve 20 in extended position.

To operate the device, the handle is grasped with the fingers and the thumb or part of the hand at the base of the thumb, and is brought against the top of the piece 8. The scoop is inserted into the ice cream and turned while depressing the rod 7, so that the scoop segments 15 and 16 will cut effectively into the bulk of ice cream and encase the ice cream thus scooped, when their outer edges are brought into engagement with one another. After scooping up the cream, upon releasing pressure on the member 8, the spring will force the parts into normal position and the segments 15 and 16 will open and move back into the scoop member 2, allowing the ice cream to drop from the scoop. Should the ice cream stick, it is only necessary to place the thumb on the flange 21 and depress the tubular member 20, so that the disk 18 will be extended and push the ball of ice cream out of the opened scoop. These operations may be easily and quickly carried out, due to the arrangement of the members 8 and 21 with relation to the body 1 and handle 6. To allow air to escape and prevent the sticking of the ice cream, the segments are provided with vents 22' which are in the portions of the segments in line with the slots 13.

The device of my invention is constructed with a view to generally improve ice cream scoops, first, so as to render the operation of such scoops easier, more simple and quicker, and second, so as to render them stronger and more durable.

The head or finger piece 8 is carried on the upper end of a tubular member 23, which member slidably extends into the tube 20 and is secured to the rod 7 by a fastening element 24, it being sufficiently larger in diameter than the rod to accommodate the expansion spring 9. One end of this spring 9 engages a transverse pin 25 carried on the body portion 1 and the other end of the spring abuts a collar 26 at the outer end of the member 23. The spring 22 abuts the pin 25 at one end and at its other end engages the lower end of the tubular member 20 where the arms 19 are attached to said member 20. By this arrangement the springs are completely and compactly housed in the body of the device.

I claim:

1. A scooping device comprising a tubular body portion, a semi-spherical scoop member carried on one end of the body portion, segment scoop members normally housed within and pivoted to the semi-spherical scoop member and arranged with the latter so as to provide a hollow spherical container when extended, means movable in the direction of the longitudinal axis of said body portion for extending the segment scoop member, spring means for returning said members to normal position and a handle member carried by and projecting substantially at right angles to the body portion intermediate the ends of the latter.

2. A scooping device comprising a tubular body portion, a semi-spherical scoop member carried on one end of the body portion, segment scoop members normally housed within and pivoted to the semi-spherical scoop member and arranged with the latter so as to provide a hollow spherical container when extended, means movable in the direction of the longitudinal axis of said body portion for extending the segment scoop member, spring means for returning said members to normal position, a handle member carried by and projecting substantially at right angles to the body portion intermediate the ends of the latter and a plunger operating within the tubular body portion and having one end extending into the semi-spherical member to engage and push outwardly on materials held in said scoop member, one end of said plunger terminating above the plane of the handle.

3. A scooping device comprising a tubular body portion, a semi-spherical scooping member carried on one end of the body portion, a member movable longitudinally in the tubular body, scoop segments pivoted within said scoop and adapted when extended to form with said scoop member a hollow spherical container, arcuate links pivoted to said longitudinal movable member and to said scoop segments, spring means normally holding said movable member in extended position and a handle carried on the body portion.

4. A scooping device comprising a tubular body portion, a semi-spherical scooping member carried on one end of the body portion, a member movable longitudinally in the tubular body, scoop segments pivoted within said scoop and adapted when extended to form with said scoop member a hollow spherical container, arcuate links pivoted to said longitudinal movable member and to said scoop segments, spring means normally holding said movable member in extended position and a handle carried on the body portion, said links being crossed intermediate their ends and of arcuate form, said tubular body and scoop member having slots extending longitudinally therein on opposite sides thereof in which said links operate.

5. A scooping device comprising a tubular body portion, a semi-spherical scooping member carried on one end of the body portion, a member movable longitudinally in the tubular body, scoop segments pivoted within said scoop and adapted when extended to form with said scoop member a hollow spherical container, arcuate links pivoted to said longitudinal member and to said scoop segments, spring means normally holding said movable member in extended position, a handle carried on the body member and means movable longitudinally in the body portion and having one end arranged to extend into the scoop member for pushing outwardly on material tending to stick in said scoop member.

6. A scooping device comprising a tubular body, a semi-spherical scoop member carried on one end of the body, there being an opening communicating the interior of the scoop with the interior of the body, a member movable longitudinally in the body portion and extending beyond the same, a tubular member receiving a portion of and being fixed to the movable member, a spring surrounding the movable member extending into said tubular member and against the action of which said movable member is operated, a tubular member surrounding the movable member and first named tubular member and projecting beyond the tubular body portion at one end of the latter, a pushing disk located within the scoop member, means of connection between the last named tubular member and pushing disk which when the last named member is depressed, will cause said disk to push against material in the scoop, scoop segments pivoted within the scoop member and arranged to be moved into position to form with the scoop member a hollow spherical container and means of connection between the movable member and scoop segments providing for extension of the latter out of the scoop member upon movement of the movable member.

FREDERICK C. KIRCHHOFF.